United States Patent Office 3,420,786
Patented Jan. 7, 1969

3,420,786
SELF-EXTINGUISHING STYRENE POLYMER COMPOSITION CONTAINING A BROMINE COMPOUND AND 2,3 - DIMETHYL - 2,3 - DIPHENYL BUTANE
Heinz Weber and Heinz Burger, Ludwigshafen (Rhine), Guenther Daumiller, Ziegelhausen, and Herbert Willersinn and Johannes Grohmann, Ludwigshafen (Rhine), Germany, assignors to Badische Anilin- & Soda-Fabrik Aktiengesellschaft, Ludwigshafen (Rhine), Germany
No Drawing. Filed Mar. 22, 1966, Ser. No. 536,278
Claims priority, application Germany, Apr. 1, 1965, B 81,260, B 81,261
U.S. Cl. 260—2.5          9 Claims
Int. Cl. C08f 45/54; C08f 47/08; C08f 7/04

This invention relates to molding materials of self-extinguishing plastics which contain an organic bromine compound and 2,3-dimethyl-2,3-diphenylbutane as flameproofing agents.

It is known that substances containing halogen may be used as flame-proofing agents for thermoplastic polymers. To achieve adequate flame-retardant action, it is necessary to add relatively large amounts of halogen-containing substances to the polymers. Many of the properties of the polymers are however, deleteriously affected in this way.

It is also known that the flame-retardant action of halogen-containing compounds may be intensified by additives so that satisfactory flame-retardance can be achieved with much smaller amounts of the said compounds. Thus for example by adding organic peroxides it is possible to improve the flame-retardant action of organic bromine compounds. Organic peroxides have the disadvantage however that they are toxic and liable to decompose explosively. Sensitive persons handling these peroxides may contract dermatitis. Moreover it is necessary to take expensive and troublesome precautions to avoid explosions in the handling of peroxides. Moreover it is known that peroxides decompose slowly even at room temperature so that plastics containing peroxides are no longer self-extinguishing after prolonged storage. Furthermore, the mechanical properties of plastics containing peroxides gradually deteriorate owing to degradation of the polymer chain.

The object of the present invention is to provide self-extinguishing molding materials which contain a styrene polymer and an organic bromine compound and also 0.01 to 5% by weight, on the molding material, of 2,3-dimethyl-2,3-diphenylbutane.

Suitable styrene polymers include polystyrene and copolymers of styrene which contain at least 50% by weight of copolymerized styrene units. Examples of copolymerization components are α-methylstyrene, acrylonitrile, methacrylonitrile, esters of acrylic or methacrylic acid with alcohols having one to eight carbon atoms, fumaric esters with alcohols having one to eight carbon atoms, N-vinyl compounds, such as N-vinylcarbazole, butadiene or small amounts of divinylbenzene.

The self-extinguishing molding materials may also contain so-called impact-resistant styrene polymers, for example products obtained by polymerizing styrene, if desired with other monomers, in the presence of finely divided elastomeric polymers. Such polymers may also be prepared by mixing styrene-acrylonitrile copolymers with butadiene polymers or acrylic ester polymers.

The organic bromine compounds should contain at least four carbon atoms and more than 40% of bromine. Examples of suitable organic bromine compounds are tetrabromobutane, dibromoethylbenzene, hexabromobenzene, esters or acetals of dibromopropanol, such as tris-(dibromopropyl) phosphate, and also pentabromodiphenyl ether. Organic bromine compounds which are difficultly volatile, which have little or no plasticizing action and have no unpleasant odor are particularly suitable. Particularly suitable examples of these are the bromination products of butadiene or isoprene oligomers or polymers, for exaxmple 1,2,5,6,9,10-hexabromocyclododecane, octabromohexadecane or brominated natural or synthetic rubber. The bromine compounds are used in such amounts that the molding materials have a bromine content of at least 0.1% by weight. In most cases it is not necessary for the material to contain more than 5% by weight of bromine. The preferred bromine content is 0.5 to 3% by weight. The molding materials should contain from 0.01 to 5% by weight, preferably 0.02 to 2% by weight (on the polymer), of 2,3-dimethyl-2,3-diphenylbutane.

Molding materials which are suitable for the production of self-extinguishing foam structures have special importance. They contain an expanding agent in addition to styrene polymers, organic bromine compounds and 2,3-dimethyl-2,3-diphenylbutane.

The expanding agents contained in the molding materials are advantageously liquid or gaseous organic compounds which do not dissolve the polymer and whose boiling point is below the softening point of the polymer, as for example aliphatic or cycloaliphatic hydrocarbons, such as propane, butane, pentane, hexane, heptane, cyclohexane or halohydrocarbons, such as methyl chloride, dichlorodifluoromethane or 1,2,2-trifluoro-1,2,2-trichloroethane. Mixtures of expanding agents may also be contained in the molding materials. It is advantageous to use 3 to 10% by weight (on the styrene polymer) of expanding agent.

Other components that may be contained in the molding materials are for example fillers, pigments, lubricants, plasticizers, antistatic agents, aging retardants, stabilizers or compounds which promote foam formation.

For the production of the molding materials, the 2,3-dimethyl-2,3-diphenylbutane may be mixed with the organic bromine compound or individually and successively with the styrene polymer and if desired with other components. They may be introduced into the plastic for example on rollers, in an extruder or in a kneader. In many cases they may be added to the monomers prior to polymerization. It is also possible, for example in the production of cast film, to add them with the bromine compound to a solution of the plastic and then to evaporate the solvent.

It is a particular advantage that 2,3-dimethyl-2,3-diphenylbutane does not disturb the polymerization of the monomeric starting material. For the production of the self-extinguishing plastics materials according to this invention, the monomers may therefore be polymerized in the presence of this compound and also the organic bromine compound. Particularly homogeneous dispersion of the flameproofing agent and 2,3-dimethyl-2,3-diphenylbutane in the molding material is obtained in this way. It is also an advantage that handling of 2,3-dimethyl-2,3-diphenylbutane is harmless in contrast to other substances which increase the action of the organic bromine compound. It has ben found moreover that the self-extinguishing property of the molding materials is not lost even when the materials are stored for long periods at elevated temperatures.

The self-extinguishing property of the molding materials is tested in the following way: to test unexpanded material moldings having the dimensions 0.1 x 10 x 30 cm., and to test expanded molding materials, moldings having the dimensions 0.5 x 15 x 40 cm. are held for five seconds in a gas flame having a flame height of 40 mm. and the flame is then gently removed. The time required for the flame to extinguish itself after the molding has been removed from the flame is a measure of the material's self-extinguishing property. Molding materials which are not self-extinguishing or are inadequately self-extinguishing will burn away completely after having been removed from the flame.

The molding materials may be for example in the form of beads, cylindrical granules or in the form of lumps such as are obtained by grinding products of substance polymerization. The particles may have a diameter of 0.1 to 6 mm., preferably of about 0.4 to 3 mm.

From such expandable molding materials, for example self-extinguishing foam articles are obtained when fine particles of the molding materials are heated in gas-permeable molds to temperatures above the softening point of the polymer contained in the molding material, so that the particles expand and fuse together to form moldings. These expandable molding materials may also be processed into foam sheeting by means of extruders.

The molding materials may also be processed for example by injection molding or extrusion into self-extinguishing moldings or sections. Owing to their relatively low content of organic bromine compounds, the molding materials according to this invention have softening points which do not differ appreciably from those of the polymers contained therein.

To prepare webs and sheeting of self-extinguishing expanded plastics, for example particulate mixtures which already contain the individual components are heated to temperatures above their softening point and extruded. In the same way the individual components may be mixed in suitable mixing equipment and the resultant mixture extruded. Mixing is advantageously carried out in continuous equipment, for example in an extruder. Temperatures are used which are higher than the softening point of the plastic. The mixtures should be kept under a pressure which is at least equal to the pressure of the expanding agent. This prevents the mixtures from expanding during mixing or during heating up to temperatures above the softening point. The pressure of the expanding agent is defined as the pressure which is set up at the temperature in question. If organic liquids are used as expanding agents, or gaseous compounds below their critical temperature, then the pressure of the expanding agent is equivalent to the vapor pressure of the expanding agent which develops above the mixture of the thermoplastic and the expanding agent.

The mixtures are extruded into a zone of lower pressure. The pressure in this zone should be lower than the pressure of the expanding agent at the prevailing temperature, so that the mixture expands. In most cases it is best to extrude the mixtures into a zone which is at atmospheric pressure. Sometimes it may be advantageous to maintain the pressure in the zone at less than atmospheric pressure.

The invention is further illustrated by the following examples in which parts and percentages are by weight.

Example 1

A number of batches are prepared by dissolving 30 parts of a styrene polymer and certain amounts of an organic bromine compound and of 2,3-dimethyl-2,3-diphenylbutane in 100 parts of methylene chloride. Then 3 parts of pentane is added to the solution. The solution is poured onto a glass sheet and the methylene chloride is allowed to evaporate at room temperature. The pentane remains in homogeneous dispersion in the self-extinguishing composition. The sheeting obtained is expanded in steam at 100° C. and dried in vacuo at 35° C. for twelve hours. The foam sheeting is tested for its flame-retardance by the abovementioned methods. The results are given in the following table in which:

OBC=percent by weight of organic bromine compound
DDB=percent by weight of 2,3-dimethyl-2,3-diphenyl-butane
T=the length of time in seconds that the material continues to burn
HBCD=hexabromocyclododecane
TDPP=2,3-tris-(dibromopropyl) phosphate.

TABLE

| Styrene polymer | OBC | DDB | T |
| --- | --- | --- | --- |
| Polystyrene (HBCD) | 1.0 | | 11.0 |
| | 1.0 | 0.3 | 2.6 |
| | 1.0 | 0.5 | 1.6 |
| | 1.25 | | 9.0 |
| | 1.25 | 0.3 | 2.0 |
| | 1.25 | 0.5 | 2.0 |
| | 1.5 | | 6.4 |
| | 1.5 | 0.3 | <0.5 |
| | 1.5 | 0.5 | <0.5 |
| Polystyrene (TDPP) | 1.0 | | >20 |
| | 1.0 | 0.3 | 10.1 |
| | 1.0 | 0.5 | 9.6 |
| | 1.6 | | >23 |
| | 1.6 | 0.3 | 10.5 |
| | 1.6 | 0.5 | 2.8 |
| Copolymer of 75% by weight of styrene and 25% by weight of acrylonitrile (HBCD). | 1.0 | | 9.0 |
| | 1.0 | 0.3 | 3.0 |
| | 1.0 | 0.5 | 3.0 |

Example 2

Mixtures of 100 parts of a styrene polymer (prepared by polymerization of 95 parts of styrene in the presence of 5 parts of polybutadiene), 1.5 parts of hexabromocyclododecane and 0.3 or 0.5 part of 2,3-dimethyl-2,3-diphenylbutane are extruded from an extruder having a sheeting die into sheeting having a thickness of 1 mm.

The sheeting obtained is tested for its self-extinguishing property. The sheeting containing 0.3% by weight of 2,3-dimethyl-2,3-diphenylbutane is self-extinguished 3.4 seconds after having been removed from the extraneous flame and the sheeting containing 0.5% by weight of 2,3-dimethyl-2,3-diphenylbutane is self-extinguished 0.9 second after having been removed from the extraneous flame. When sheeting which contains the same amount of hexabromocyclododecane but no 2,3-dimethyl-2,3-diphenylbutane is tested for comparison, the sheeting burns away completely.

Example 3

An attachment for pumping in liquid is fixed in approximately the first third of the barrel of a double screw extruder whose screw has an L/D ratio of 25. A mixture of 100 parts of polystyrene, 1.5 parts of hexabromocyclododecane, 0.3 part of 2,3-dimethyl-2,3-diphenylbutane and 1 part of kaolin is introduced through the feed hopper. The temperature in the fluxing zone is 180° C. In the following mixing zone, such an amount of methylchloride is continuously forced in through the said attachment that the mixture leaving the extruder head contains about 10% (on the polystyrene) of methyl chloride. The temperature in the mixing zone is 160° C. In the following cooling zone, the mixture is cooled to such an extent that the mixture issuing from the die has a temperature of 110° C. The strand issuing from the die expands. The expanded strand obtained has a density of about 40 g./l.

A test specimen cut from this foam web and having the dimensions 1.5 x 20 x 30 cm. is held in a gas flame having a flame 40 mm. in height for five seconds and the flame is then gently withdrawn.

A test specimen containing 1.5 parts of hexabromocyclododecane is self-extinguished in 5.5 seconds. If 0.3 part of 2,3-dimethyl-2,3-diphenylbutane be mixed with the 1.5 parts of hexabromocyclododecane, the specimen is self-extinguished in less than half a second.

A specimen prepared for comparison without the use of 2,3-dimethyl-2,3-diphenylbutane burns away completely.

We claim:
1. A self-extinguishing plastic composition for the production of self-extinguishing moldings which contains
   (A) a styrene polymer selected from the group consisting of polystyrene and copolymers containing at least 50% by weight of copolymerized styrene units,
   (B) an organic brominated compound which contains at least four carbon atoms and more than 40% of bromine, and

(C) 2,3-dimethyl-2,3-diphenylbutane in an amount of 0.01 to 5% by weight on the weight of the styrene polymer, the amount of the bromine compound (B) being such that the composition has a content of at least 0.1% by weight of bromine.

2. A self-extinguishing expanded article of plastic comprising a porous molding of a styrene polymer selected from the group consisting of polystyrene and copolymers containing at least 50% by weight of copolymerized styrene units, said molding containing as a flame retardant: a mixture of an organic brominated compound which contains at least four carbon atoms and more than 40% of bromine; and 2,3-dimethyl-2,3-diphenylbutane in an amount of 0.01 to 5% by weight on the weight of the styrene polymer; the amount of the organic brominated compound being such that the expanded plastic article has a content of at least 0.1% by weight of bromine.

3. A self-extinguishing composition or article as claimed in claim 1 wherein the styrene polymer is polystyrene.

4. A self-extinguishing composition or article as claimed in claim 1 wherein the styrene polymer is a copolymer containing at least 50% of copolymerized styrene units.

5. A self-extinguishing composition as claimed in claim 1 wherein the content of 2,3-dimethyl-2,3-diphenylbutane is 0.02 to 2% by weight on the styrene polymer.

6. A self-extinguishing composition as claimed in claim 1 wherein the plastic composition has a content of bromine of 0.5 to 3% by weight.

7. A self-extinguishing expanded plastic article as claimed in claim 2 wherein the content of 2,3-dimethyl-2,3-diphenylbutane is 0.02 to 2% by weight on the styrene polymer.

8. A self-extinguishing expanded plastic article as claimed in claim 7 wherein the expanded plastic article has a content of bromine of 0.5 to 3% by weight.

9. A self-extinguishing expanded plastic article as claimed in claim 8 wherein the styrene polymer is polystyrene.

References Cited
UNITED STATES PATENTS

| | | | |
|---|---|---|---|
| 3,271,333 | 9/1966 | Eichhorn | 260—2.5 |
| 3,274,133 | 9/1966 | Ingram | 260—2.5 |

MURRAY TILLMAN, *Primary Examiner.*

W. J. BRIGGS, SR., *Assistant Examiner.*

U.S. Cl. X.R.

260—45.7